United States Patent [19]

Sauvee et al.

[11] Patent Number: 4,671,168
[45] Date of Patent: Jun. 9, 1987

[54] SINGLE ACTUATOR TANDEM BRAKE PRESSURE CONTROL VALVE

[75] Inventors: Jean-Paul Sauvee, Aubervilliers; Roland Levrai, Stains; Christian Riquart, Paris, all of France

[73] Assignee: Bendix France, Paris, France

[21] Appl. No.: 827,128

[22] Filed: Feb. 6, 1986

[30] Foreign Application Priority Data

Feb. 27, 1985 [FR] France ................................ 85 02824
Oct. 9, 1985 [FR] France ................................ 85 14947

[51] Int. Cl.⁴ ..................... F15B 11/00; F15B 17/02; B60T 11/28
[52] U.S. Cl. ..................................... 91/530; 91/460; 60/589; 137/596.14
[58] Field of Search ................ 60/533, 565, 589, 550; 91/460, 530, 280; 137/596.14

[56] References Cited

U.S. PATENT DOCUMENTS 2,574,969 11/1951 Heidloff ................................ 60/589
2,992,533 7/1961 Hodkinson ........................ 50/565 X
4,075,848 2/1978 Ueda ..................................... 60/548

FOREIGN PATENT DOCUMENTS 2164879 3/1973 France .
2001721 2/1979 United Kingdom .

Primary Examiner—Robert E. Garrett
Assistant Examiner—George Kapsalas
Attorney, Agent, or Firm—Larry J. Palguta; Ken C. Decker

[57] ABSTRACT

Hydraulic assistance device, comprising a body (10) comprising a bore (12) in which a first piston mechanism and a second piston mechanism (18, 20) are slideably mounted, the first piston mechanism (18) being movable under the effect of the actuation of a third piston (16) slidably mounted in the body (10), and the second piston mechanism (20) being movable by the intermediary of a hydrostatic connection formed in a pressure chamber (22) defined between the first and the second piston mechanism (18, 20), a respective valve mechanism (60, 100) being associated with each piston mechanism (18, 20) in a respective hydraulic circuit between a source of fluid under pressure (52, 96) and a respective braking circuit (74, 110); and a third chamber (36) defined in the bore (12) between the first piston mechanism (18) and the third piston (16), the third chamber (36) being connected to a low pressure reservoir (25) through a passage in which a valve mechanism (42) is mounted, characterized in that the device incorporates a second valve mechanism (112) in a second passage (130, 132) between the third chamber (36) and the reservoir (25), the second valve mechanism (112) being sensitive to the pressure of the corresponding source of pressure (52) so that upon failure of this high pressure source, the second valve mechanism (112) closes so as to isolate the third chamber (36) from the reservoir (25).

8 Claims, 2 Drawing Figures

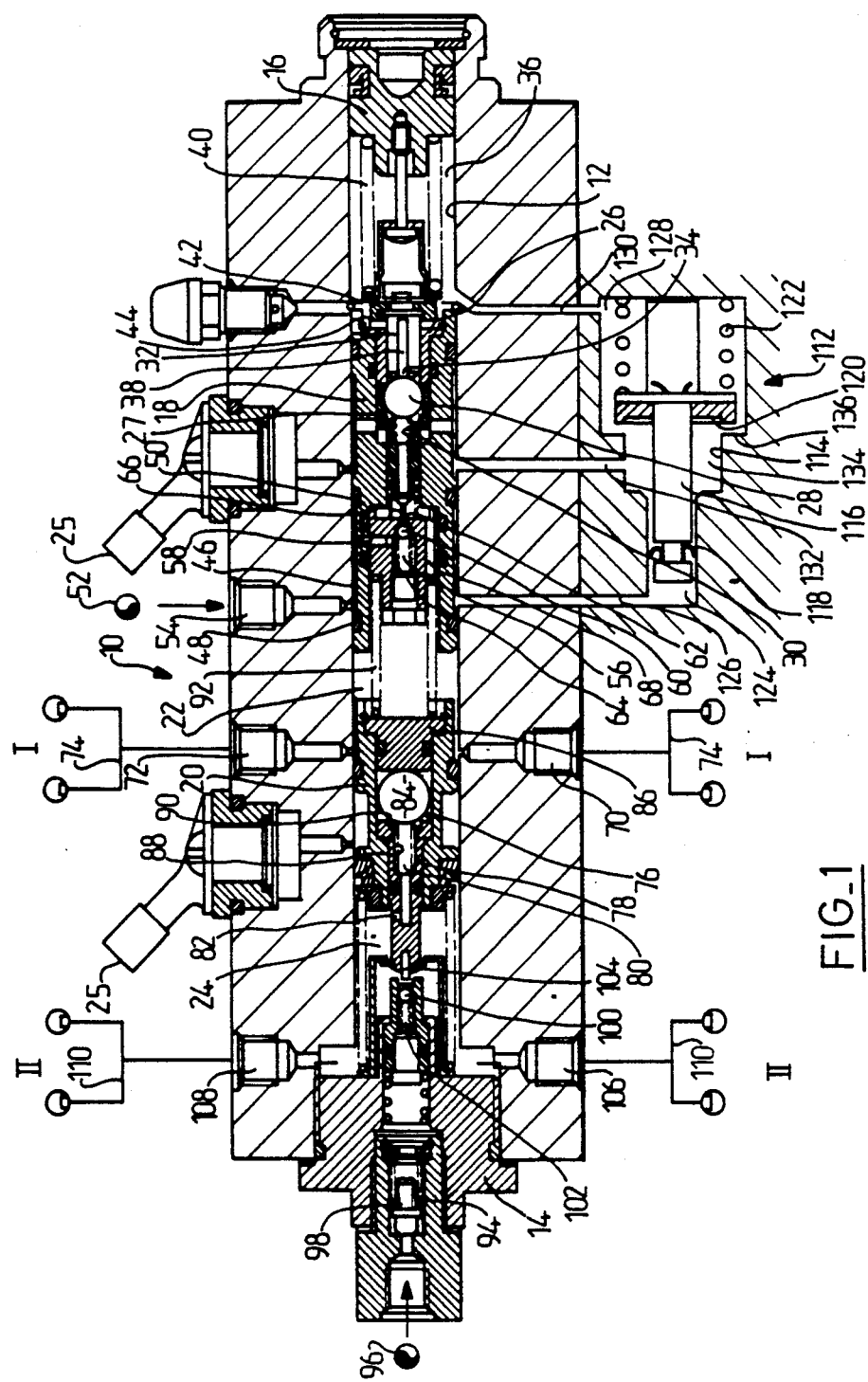
FIG_1

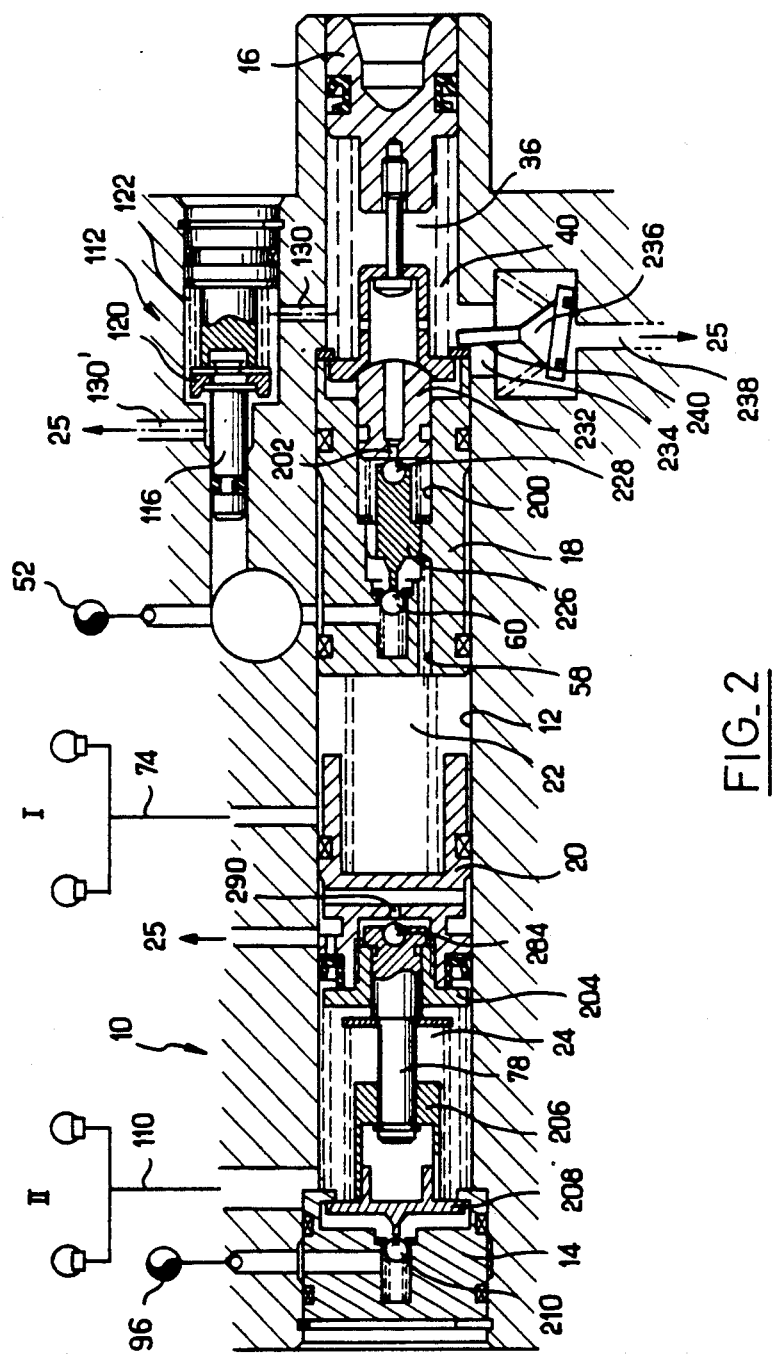
FIG_2

SINGLE ACTUATOR TANDEM BRAKE PRESSURE CONTROL VALVE

FIELD OF THE INVENTION

The present invention relates to a hydraulic assistance device and more particularly to such a device for a dual braking circuit with mixed hydrodynamic (known as "full power") and hydrostatic operation.

BRIEF DESCRIPTION OF THE PRIOR ART

A hydraulic assistance device for a dual braking circuit is described in U.S. patent application Ser. No. 691,346 and is of the "full power" type which is capable of operating as a conventional master cylinder, in a hydrostatic mode, in the case of failure of the high pressure supply circuit. This device comprises two pistons which are slideably mounted in a common bore and which are each associated with a respective braking circuit. One piston is moveable by a brake pedal and a hydrostatic connection between the two pistons causes movement of the second piston. Each piston comprises a valve means which, when the device is operated, puts a respective source of high pressure fluid into communication with the brakes of the vehicle. The brake pedal acts upon a piston which is slideably mounted in the bore and this piston is connected to the first piston means by a spring to provide pedal feel. In the case of rapid braking it is possible that a valve between a chamber, defined between the piston and the first piston, and low pressure reservoir may close undesiderably and form a direct hydrostatic connection between the piston and the first piston. The result of this connection is that the pedal feel is reduced, and in addition the opening of the first valve means become too abrupt.

SUMMARY OF THE INVENTION

The object of the invention is therefore to provide an improved hydraulic assistance device for a dual circuit of the type known as "full power" which is capable of operating as a conventional master cylinder in the event of failure of the high pressure circuit and in which the feature of pedal feel is assured.

According to the invention there is provided a hydraulic assistance device comprising a body comprising a bore in which a first piston means and a second piston means are slideably mounted, the first piston means being movable under the effect of the actuation of third piston slideably mounted in the body, and the second piston means being movable by the intermediary of a hydraulic connection formed in a pressure chamber defined between the first and the second piston means, a respective valve means being associated with each piston means in a respective hydraulic circuit between a source of fluid under pressure and a respective braking circuit; and a third chamber defined in the bore between the first piston means and the third piston, the third chamber being connected to a low pressure reservoir through a passage in which a valve means is mounted, characterized in that the device incorporates a second valve means in a second passage between the third chamber and the reservoir, the second valve means being responsive to the pressure of the corresponding source of pressure so that, upon failure of this high pressure source, the second valve means closes so as to isolate the third chamber from the reservoir.

According to a second embodiment of the invention the first piston means further comprises a control piston on which is fixedly mounted a ball adapted to close a valve seat in the first piston means to thereby close the fluid passage between the first pressure chamber and the third chamber.

The invention will now be described by way of example with reference to the accompanying drawings, in which:

BRIEF DESCRIPTION OF THE DRAWINGS

FIG. 1 is a longitudinal sectional view of a hydraulic assistance device according to a first embodiment of the invention, and FIG. 2 is a longitudinal sectional view of a device according to a second embodiment of the invention.

DESCRIPTION OF THE PREFERRED EMBODIMENTS

As shown in FIG. 1, the hydraulic assistance device, which in the example shown is a master cylinder for a braking circuit, comprises a body 10 including a single bore 12 which is closed at one end by a closure component 14. A third piston 16 is slideably mounted in the bore 12 and is intended to be connected to a brake pedal of a vehicle (not shown). A first piston means and a second piston means 18, 20 are slideably mounted in the bore 12 defining between them a first pressure chamber 22. A second pressure chamber 24 is defined between the second piston means 20 and the closure component 14. The first piston means 18 comprises a control piston 26 which includes, in an internal bore 27 connecting the first chamber 22 to a low pressure reservoir 25 (not shown), a ball 28 which is pushed to the right, (when viewing the drawings), by a spring 30. A control component 32 is slideably mounted in bore 27 and has at its end a seat 34, which is capable of being closed by the ball 28 and connected to a chamber 36 in the bore 12 by an internal passage 38. The control component 32 is connected to the third piston 16 by a spring 40 and comprises an annular seal 42 which is capable of closing the passage between the passage 38 and the chamber 40 by coming into abutment against an annular shoulder 44, at the rear of the control piston 26.

The first piston means 18 defines with the bore 12 an annular space 46 which is bounded axially by two annular cups 48, 50 and is connected to a source of high pressure hydraulic fluid 52 by a passage 54 in the body 10. The first piston means 18 also includes a bore 56 which is in hydraulic communication with the annular space 46 by way of a lateral opening 58 and which includes a ball 60 which is normally pushed towards a seat 62 by a spring 64. The control piston 26 comprises a rod 66 which, when the control piston moves to the left, lifts the ball 60 from its seat 62 and allows fluid to pass under pressure from the source 52 through a passage 68, the first pressure chamber 22 and two outlets 70, 72 towards the brakes of a primary braking circuit 74.

The second piston means 20 comprises a stepped bore 76 in which a control piston 78 is slideably mounted in a sealed manner, and which includes a stepped bore 80 and a lateral opening 82 which together join the second chamber 24 to the reservoir 25. A ball 84 is mounted in the bore 76, the ball 84 being retained by a piston component 86 and normally pushed to the right by a spring 88 so as to open a seat 90 formed in the bore 80 of the control piston 78. A spring 92 connects the first and second piston means 18, 20.

The closure component 14 includes a stepped bore 94 which is connected to a high pressure source of fluid 96 and which comprises a first valve means 98 and a ball valve 100 which is normally pushed towards its closed position by a spring 102. The control piston 78 comprises a rod 104 which, when the control piston moves to the left, opens the ball valve 100 and allows the fluid under pressure to pass through the second chamber 24 and two ports 106, 108 towards the brakes of a secondary braking circuit 110.

According to the invention, the hydraulic assistance device also includes in the body 10 a valve means generally indicated by reference 112. The valve means 112 comprises a stepped bore 114 in which a valve 116 is slideably mounted and which includes two annular cups 118, 120 and a spring 122 which normally pushes the valve to the left, (when viewing the drawings). One end 124 of the bore 114 is connected by way of a passage 126 and the annular space 46 to the high pressure source 52. The other end 128 of the bore 114 is connected to the chamber 40 through a passage 130. A third passage 132 connects the central portion 134 of the bore 114 to the low pressure reservoir 25. If the valve 116 moves to the left, the cup 120 comes into contact with an annular wall 136 of the stepped bore 114 and isolates the chamber 40 from the reservoir 25. The high pressure source 52 is isolated from the reservoir 25 and from the chamber 36 by the cup 118, the high pressure of this source simply pushing the valve 116 to the right against the force of the spring 122.

The device described above operates as follows. A force applied by the brake pedal onto the piston 16 is transmitted by the spring 40 to the control component 42 which moves to the left, and closes the ball valve 28. The control piston 26 then moves relative to the first piston means 18 and opens the ball 60 by way of the rod 66. Opening the ball 60 allows fluid under pressure to pass from the source 52 through the opening 58, the passage 68, the first pressure chamber 22 and the ports 70, 72, towards the brakes 74. The rise in pressure of the primary circuit causes the retraction of the control piston 26 which is in equilibrium with the pedal feel spring 40. The rise in pressure in the pressure chamber 22 also results in movement of the second piston means 20 and thus closure of the ball valve 84 and movement of the second control piston 78 to the left. This movement of the control piston 78 opens the ball 100 by way of the rod 104. Opening the ball 100 allows fluid under pressure to pass from the source 96 to the brakes 110 through the second pressure chamber 24 in which the fluid pressure will rise until equilibrium is obtained between the pressures of the primary circuit 74 and the secondary circuit 110. After the brake pedal is released, the two circuits are resupplied by the reopening of the two ball valves 28 and 84.

In normal operation, the valve means 112 remains in its open position as shown, the force of the high pressure fluid being greater than that of the spring 122. The chamber 40 is thus in hydraulic communication with the reservoir 25 and suitable pedal feel is provided by the spring 40. In the case of rapid braking, the annular cup 42, which normally remains open during operation of the device, closes, the rise in pressure of the primary braking circuit 74 being insufficiently rapid to create a reaction force on the control component 38. However the valve means 112 remains open allowing fluid to pass from the chamber 36 to the reservoir 25 and the spring for pedal feel remains operative.

In the case of failure of the high pressure circuit 52 the spring 122 closes the valve 112 since no fluid under pressure remains in the passage 126. When the device is operated, the annular cup 42 closes owing to the absence of reaction upon the control piston 26. The chamber 36 is thus isolated and a hydrostatic connection is formed between the piston 16 and the first piston means 18 rendering the spring 40 inoperative.

Another advantage of the present invention compared with the prior art lies in the fact that the piloting of the secondary circuit 110 occurs over the whole of the transverse section of the second piston means 20, which, when the device is operated reduces the effect of friction of the seals of this second piston means and the effect of sudden opening of the ball valve 100 of the secondary circuit.

A second embodiment of the invention is shown in FIG. 2 in which components common to the embodiment of FIG. 1 have the same reference numerals.

Despite its advantages the previous embodiment has a relatively large number of components resulting in increased manufacturing costs. The following embodiment was designed with a view to reducing both the number of components and the size of the device.

As shown in FIG. 2 the first piston means 18 is simplified with respect to that of the embodiment of FIG. 1 and comprises a control component 232 slideably mounted in a stepped bore 200. The control component 232 is connected to the first piston 16 by spring 40. The first piston means 18 further comprises a control piston 226 slideably mounted in stepped bore 200 and receiving, in its end adjacent the control component 232, a ball 228 adapted to close against a valve seat 202 in the control component 232 and thus close the fluid passage between the first pressure chamber 22 and chamber 36. Chamber 36 communicates with the low pressure reservoir 25 by way of a passage 130, a valve means 112 and a passage 130'. A second return passage to the low pressure reservoir 25 is provided by way of an opening 234, a tilting valve 236 and a passage 238.

The provision of two return passages to the low pressure reservoir 25 allows the omission of the valve means 42 which in the previous embodiment was needed to close chamber 40. The absence of this valve 42 allows the first piston means 18 to be shortened. Ball 228 is of a considerably smaller diameter than its equivalent, ball 28, in the first embodiment and this fact, together with that of the ball being mounted on the control piston 226 allows a reduction in the size and number of components of the first piston means 18. The risk of leaks with a small diameter ball valve is also less than that with a larger diameter ball.

When the device is operated, the movement of the first piston 16 to the left (when viewing the drawings) results in the movement to the left of the control piston 226 which opens ball valve 60 and allows fluid under pressure to pass from the high pressure source 52, through opening 58 and first pressure chamber 22 to the vehicle's primary braking circuit 74.

The second piston means 20 is also simplified with respect to that of the previous embodiment. A control piston 78 is slideably mounted in the second piston means 20 by way of an annular component 204 which is mounted in an end of the second piston means 20. In the end of the control piston 78 adjacent the second piston means 20 is mounted a ball 284 which is adapted to close against a valve seat 290 in the second piston means 20 to thus close the fluid passage between the second pressure chamber 24 and the low pressure reservoir 25. The other end of the control piston 78 is slideably received in a sleeve 206 which also receives, at its other end, an actuator element 208 which, when the device is operated, opens ball valve 210 to allow fluid under pressure to flow from the high pressure source 96 to the vehicle's secondary braking circuit 110. As was the case for the first piston means 18, the small diameter of ball 284 and the fact that it is mounted on the control piston 78 results in a reduction of the size of the device and its number of components.

The telescoping, sliding relationship between control piston 78 and sleeve 206 results in the simplification of the structure of closure component 14 while allowing sufficient travel for the second piston means in the event of a high pressure circuit failure whereupon the device operates as a conventional master cylinder in a hydrostatic mode.

The device operates in a similar way to that of the first embodiment, apart from the following differences. In the event of a failure of the primary high pressure source 52, the ball valve 228 remains open while valve means 112 closes under the effect of spring 122. Tilting valve 236 closes when the first piston means 18 moves away from its illustrated rest position. Thus the first piston 16 becomes the piston of a conventional, hydrostatic master cylinder and fluid passes from chamber 36 via valve seat 202 and opening 58 to the primary braking circuit 74. This method of operation results in a reduction of brake pedal dead stroke. During a release of braking, valve means 112 remains closed and chamber 22 is replenished by way of tilting valve 236. During the first part of the return of the first piston means 18, the tilting valve 236 is opened as a result of the pressure differential across it. At the end of its return stroke the first piston means abuts an extension 240 of tilting valve 236 and thus holds it in its open position.

In the event of a failure of the secondary high pressure source 96, ball 284 closes against seat 290 when the device is operated and the second piston means 20 moves to the left (when viewing the drawings) and conveys fluid under pressure to the secondary braking circuit 110.

Thus it will be seen that the modified construction of the second embodiment results in a more compact assembly and a reduction in the number of components while ensuring optimum operation in both the hydrodynamic and hydrostatic modes.

We claim:

1. Hydraulic assistance device comprising a body comprising a bore in which first piston means and second piston means are slideably mounted, the first piston means (18) being movable under the effect of actuation of a third piston slideably mounted in the body, and the second piston means being movable by the intermediary of a hydrostatic connection formed in a first pressure chamber defined between the first and the second piston means, a respective valve means being associated with each piston means in a respective hydraulic circuit between a source of fluid under high pressure and a respective braking circuit; and a third chamber defined in the bore between the first piston means and the third piston, the third chamber being connected to a low pressure reservoir through a passage in which first valve means is mounted, characterized in that the device comprises second valve means in a second passage between the third chamber and the reservoir, the second valve means being responsive to pressure from a corresponding source of fluid under high pressure so that upon failure of the corresponding high pressure, the second valve means closes so as to isolate the third chamber from the reservoir.

2. Device as claimed in claim 1, characterized in that the second valve means comprises a stepped bore having a first end connected to the source of fluid under high pressure, a second end connected to the third chamber and an intermediate zone connected to the reservoir.

3. Device as claimed in claim 2, characterized in that the stepped bore comprises an annular wall, the second valve means comprises a seal which is capable of cooperating with the annular wall so as to close the second passage between the third chamber and the reservoir (25).

4. Device as claimed in claim 3, characterized in that the second valve means comprises piston means which is housed in the first end of the stepped bore and which is responsive to pressure from the source of fluid under high pressure.

5. Device as claimed in claim 1, characterized, in that the second piston means has a surface facing the first pressure chamber and which corresponds to the cross-section of the bore.

6. Device as claimed in claim 1, characterized in that the first piston means comprises a control piston on which is fixedly mounted a ball adapted to close a valve seat in the first piston means, to thereby close a fluid passage between the first pressure chamber and the third chamber.

7. Device as claimed in claim 6, characterized in that the second piston means is linked to a respective valve means by a telescopic arrangement.

8. Device as claimed in claim 6, characterized in that it further comprises a tilting valve in a passage between the third chamber and the low pressure reservoir and moveable into an open position by the first piston means when the first piston means is in a rest position.

* * * * *